United States Patent [19]

Tadatsu

[11] Patent Number: 5,042,959
[45] Date of Patent: Aug. 27, 1991

[54] UNDERSEA OPERATION SYSTEM

[75] Inventor: Gunkichi Tadatsu, Ibaraki, Japan

[73] Assignee: Masao Sakagami, Tokyo, Japan

[21] Appl. No.: 388,083

[22] Filed: Aug. 1, 1989

[30] Foreign Application Priority Data

Aug. 13, 1988 [JP] Japan ............................ 63-202517

[51] Int. Cl.⁵ ............................................. B63C 11/10
[52] U.S. Cl. ................................... 405/191; 405/188; 405/190
[58] Field of Search ............... 405/190, 191, 188, 185; 37/56, 65

[56] References Cited

U.S. PATENT DOCUMENTS

| | | |
|---|---|---|
| 3,099,913 | 8/1983 | Melton et al. . |
| 3,105,453 | 10/1963 | Hages ............................ 405/191 X |
| 3,456,371 | 7/1969 | Graham et al. . |
| 3,670,514 | 6/1972 | Breston et al. . |
| 3,683,521 | 8/1972 | Sloan et al. . |
| 3,706,142 | 12/1972 | Brunner ......................... 405/191 X |
| 3,719,116 | 3/1973 | Burton et al. ................... 405/191 X |
| 3,857,250 | 12/1974 | Di Tella et al. . |
| 3,978,679 | 9/1976 | LeComte ............................ 37/64 X |
| 3,983,707 | 10/1976 | Lezgintsev et al. ............... 37/56 X |
| 4,010,619 | 3/1977 | Hightowers et al. ............... 405/191 |
| 4,204,347 | 5/1980 | Wolters ............................ 37/56 X |

FOREIGN PATENT DOCUMENTS

| | | |
|---|---|---|
| 39716 | 1/1970 | Australia . |
| 62009 | 4/1971 | Australia . |
| 62010 | 4/1971 | Australia . |
| 62011 | 4/1971 | Australia . |
| 1553816 | 12/1968 | France . |
| 0027196 | 2/1977 | Japan ................................. 405/191 |
| 58-76394 | 5/1983 | Japan . |
| 1234085 | 6/1971 | United Kingdom . |
| 2176153 | 12/1986 | United Kingdom . |
| 2181040 | 4/1987 | United Kingdom . |

Primary Examiner—Dennis L. Taylor
Attorney, Agent, or Firm—Lowe, Price, LeBlance, Becker & Shur

[57] ABSTRACT

An undersea operation system comprising an undersea operation machine for conducting undersea operations such as undersea construction and the collection of stones and rocks, and a backup ship operatively connected to this undersea operation machine. The undersea operation machine includes a vehicle, arms which are connected to this vehicle, etc. The vehicle and the arms are operated by hydraulic pressure which is supplied through a cable connecting the undersea operation machine to the backup ship, whereby smooth operation of the undersea operation machine is ensured even in a deep sea region.

6 Claims, 9 Drawing Sheets

UNDERSEA OPERATION SYSTEM

BACKGROUND OF THE INVENTION

1. Field of the Invention

This invention relates to an undersea operation system which allows operations on the bottom of the sea in a deep region to be conducted in a very satisfactory manner.

2. Description of the Related Art

Development work necessitating, efficient undersea operations has been actively conducted. In a relatively shallow region of the sea, for example, at a depth of about 10 m, the pressure on the machines is only 1 atm. higher than on the ground, so that the same machines as used on the ground will suffice. At this depth, a sufficient mechanical efficiency can be obtained with a conventional internal combustion engine if the fuel and oxygen are supplied without water contamination. Thus, this depth allows undersea operations to be conducted with no great problems.

A depth in the range about 30 to 50 m does involve some deterioration in efficiency. However, it still allows unmanned undersea operations using perfectly waterproof equipment.

Things are different if the region is about 100 to 200 m deep. In particular, this depth involves the problem of hydraulic pressure. That is, an internal combustion engine for land use will not smoothly operate there because of the increased power needed to overcome the increased friction resulting from the longer tubes for air intake and exhaust. Moreover, it is extremely difficult to make a large-sized engine completely waterproof. Accordingly, no undersea operations can be conducted at this depth.

Thus, it has been next to impossible to conduct efficient operations using mechanical equipment on the sea bottom in a deep region.

SUMMARY OF THE INVENTION

It is accordingly an object of this invention to provide an undersea operation system which involves no deterioration in driving efficiency in any section of the undersea operation machines used and which excels in durability.

Another object of this invention is to provide an undersea operation system which prevents the undersea vehicle from tumbling down in normal operation, and, which, if it tumbles down because of geographical irregularities on the sea bottom, can restore it to its upright attitude immediately.

Still another object of this invention is to provide an undersea operation system in which the cables, etc. for power transmission are maintained in a predetermined condition, thereby precluding the danger of power transmission being interrupted.

A further object of this invention is to provide an undersea operation system which allows the work environment on the sea bottom to be supervised on the sea, thereby ensuring work reliability and safety.

In accordance with this invention, there is provided an undersea operation system comprising: an undersea vehicle having a traveling unit, a boom, and an actuator means for driving the above-mentioned traveling unit and the above-mentioned boom, the above-mentioned actuator means consisting of hydraulic motors and hydraulic cylinders; and a floating base which has a control cabin and a driving power source adapted to drive the above-mentioned actuator means and including a hydraulic pump and a prime mover; the above-mentioned actuator means and the above-mentioned driving power source being connected to each other through a cable.

DESCRIPTION OF THE PREFERRED EMBODIMENTS

An embodiment of this invention will now be described with reference to the accompanying drawings.

Figure 1:
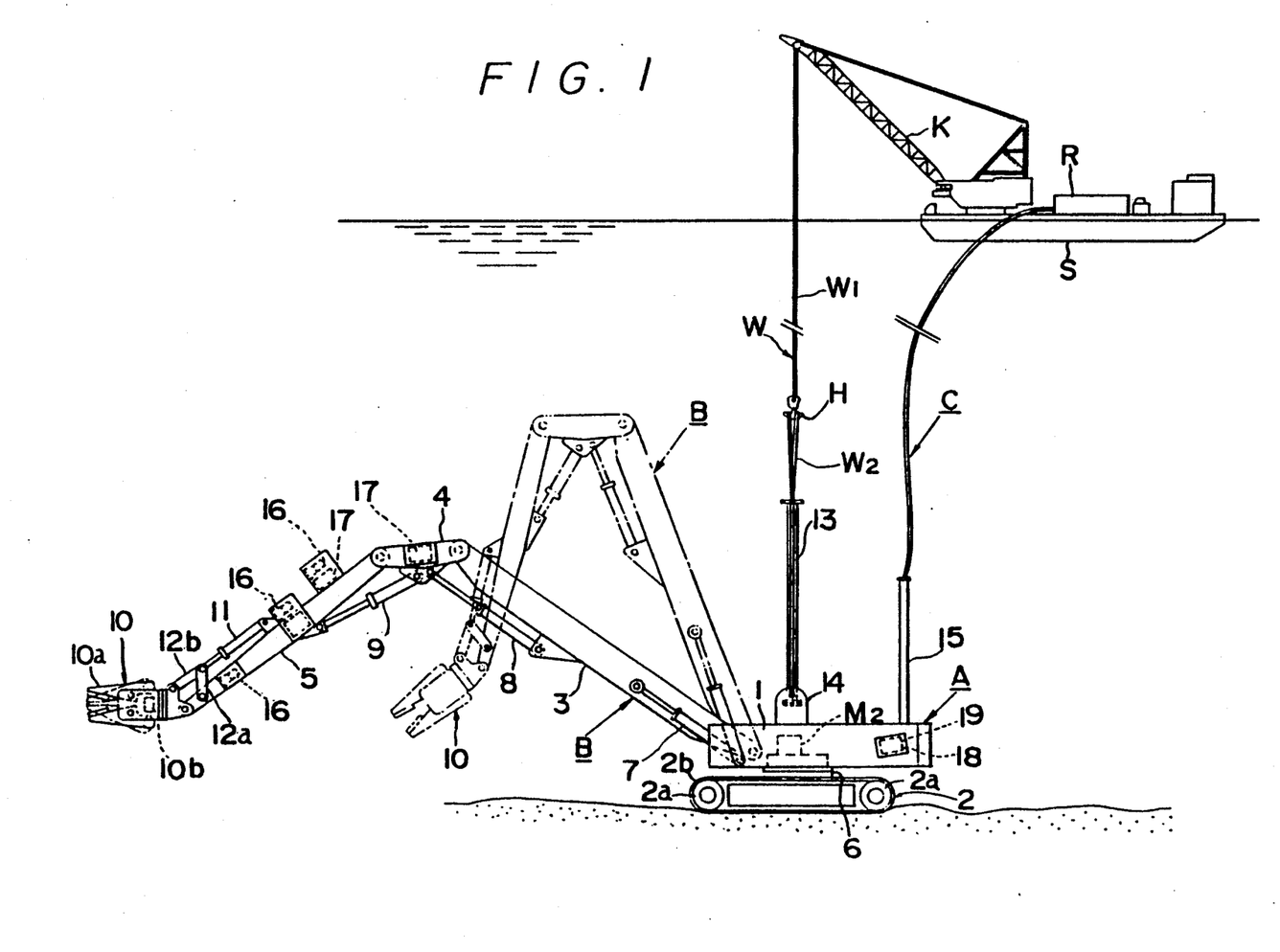
FIG. 1 is a side view illustrating how an undersea operation is conducted in accordance with an embodiment of this invention.
Figure 2:
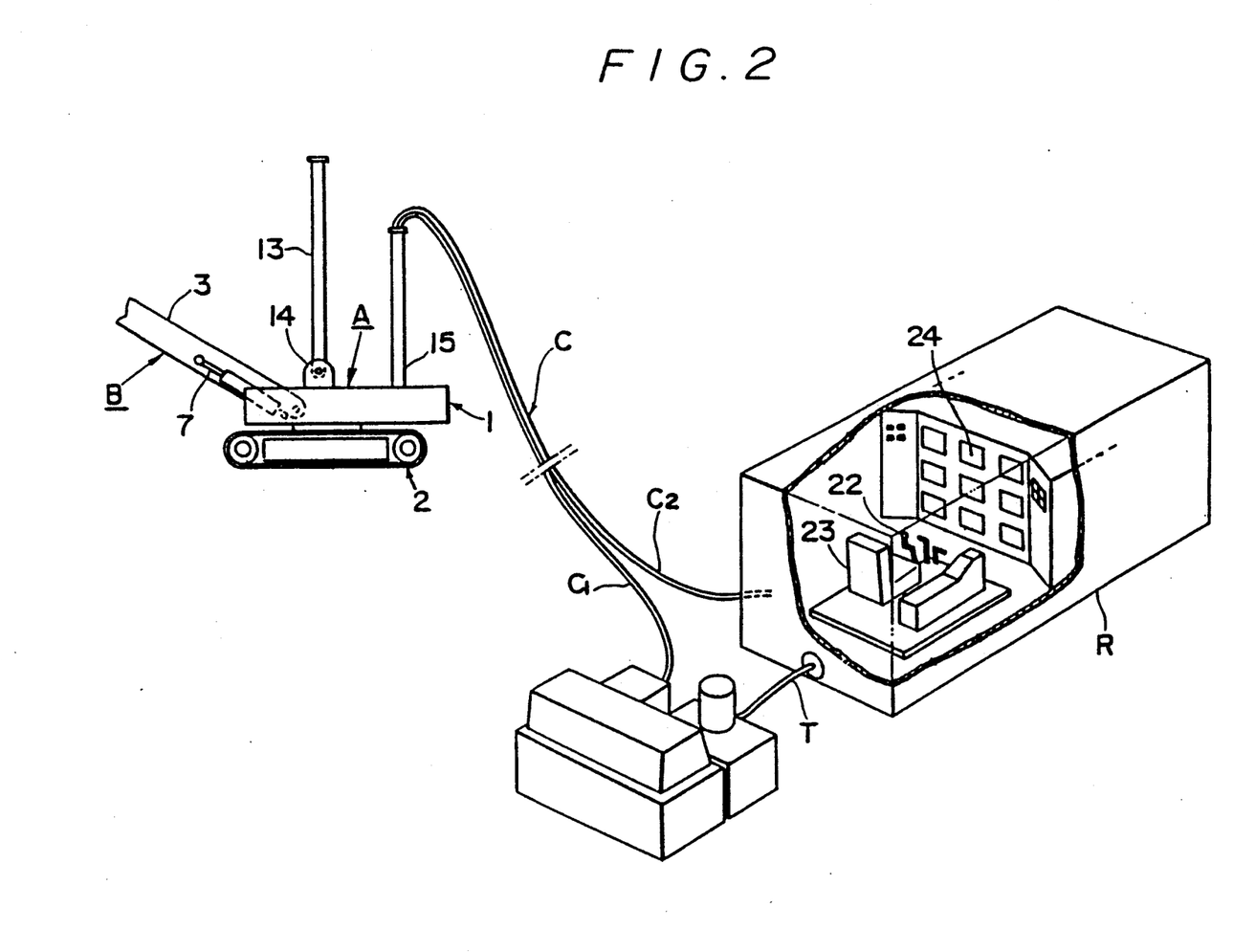
FIG. 2 is a perspective view showing essential parts of the embodiment.
Figure 3:
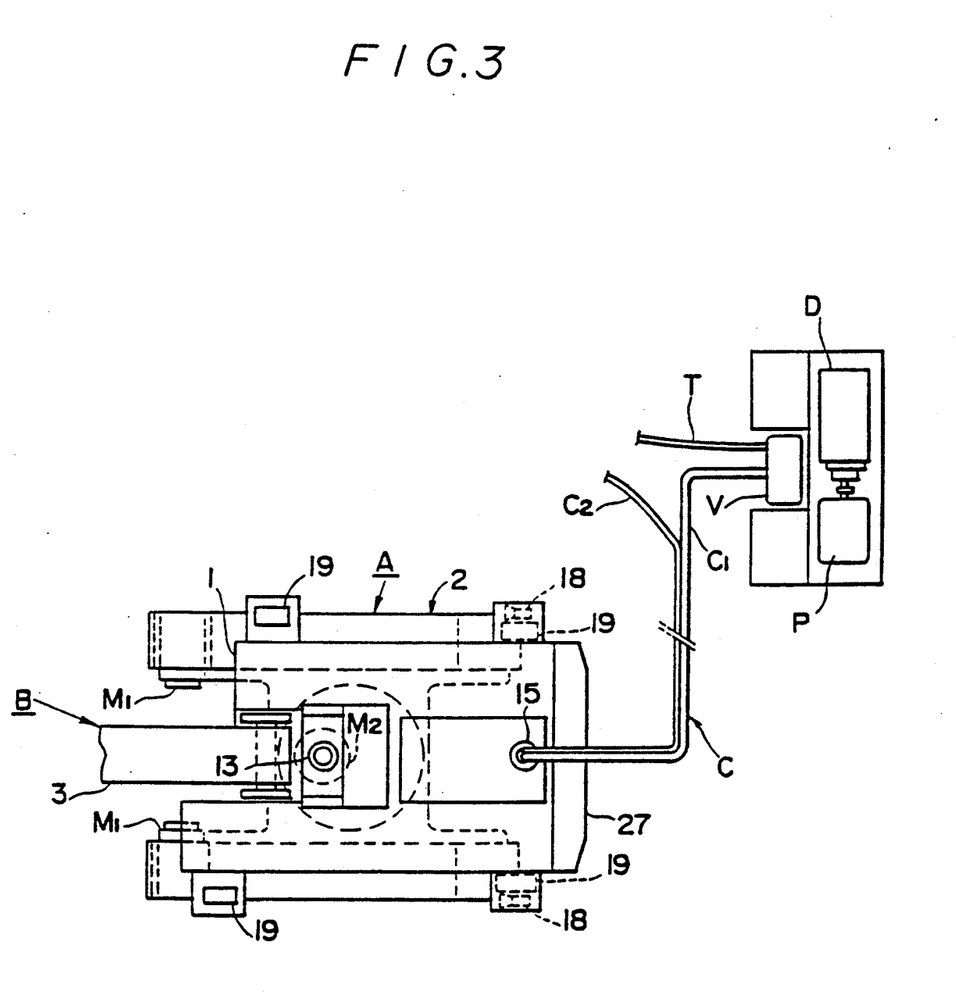
FIG. 3 is a plan view showing the undersea vehicle and the driving power unit of this embodiment.
Figure 4:
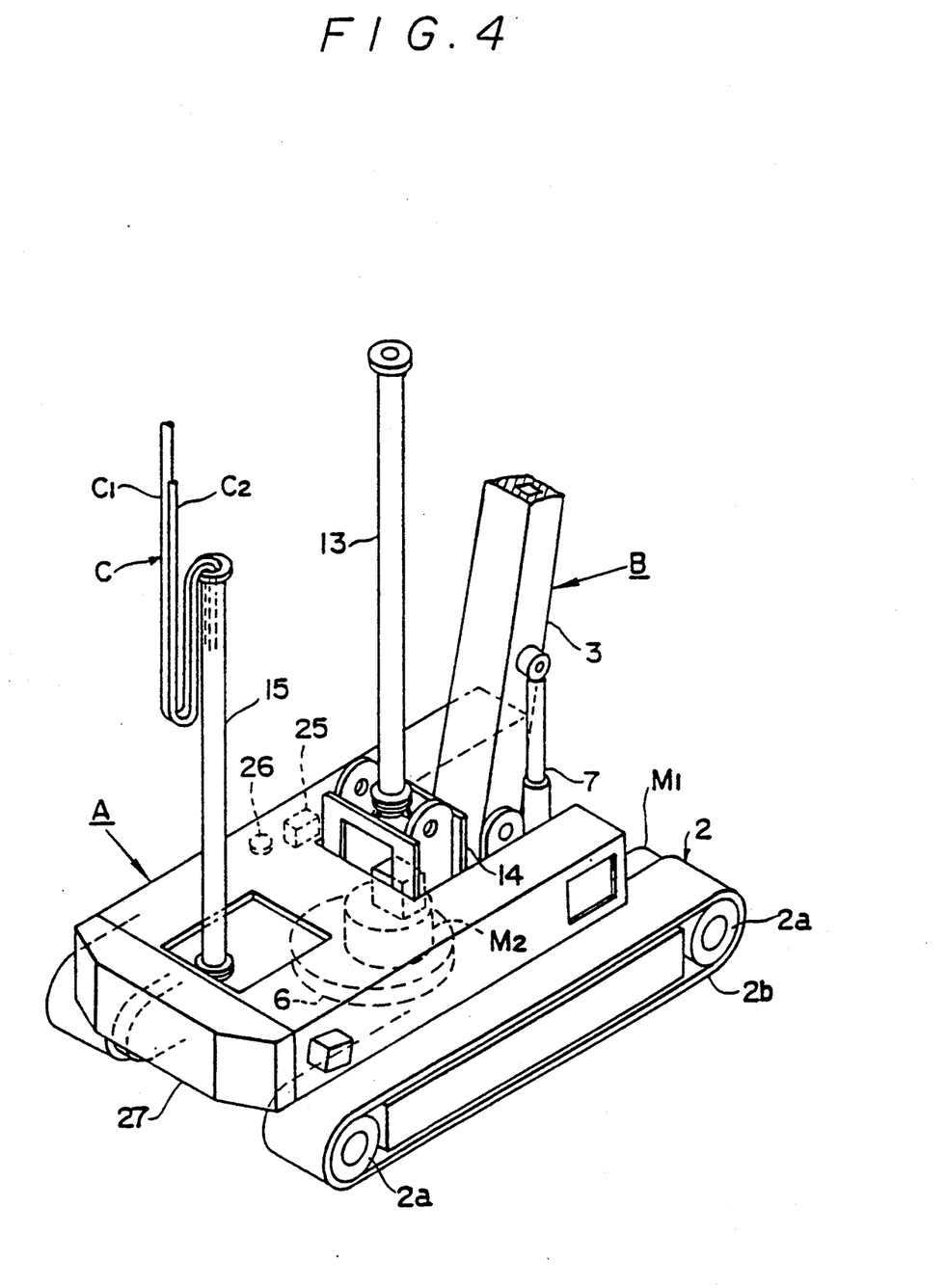
FIG. 4 is a perspective view of the undersea vehicle.

The reference character A indicates an undersea vehicle including a vehicle body 1. As shown in FIGS. 1, 3 and 4, traveling units 2, 2 are provided on both sides of the vehicle body 1. Each traveling unit 2 consists of front and rear driving sprockets 2a, 2a and a crawler 2b wound around these driving sprockets 2a, 2a, which are driven by a hydraulic motor $M_1$ constituting an actuator means. This hydraulic motor $M_1$ is equipped with pressure withstanding and waterproof properties, and is operated typically by means of hydraulic pressure or water glycol.

The reference character B indicates a boom adapted to bend and stretch appropriately and provided, as shown in FIG. 1, on the undersea vehicle A. In the embodiment shown, the boom B comprises a first arm 3 on the root-section side, a second arm 4 in the middle section, and a third arm 5 at the front end. The root section of the boom B, i.e., the root section of the first arm 3, is fixed to a swinging mechanism 6 provided approximately at the center of the front face of the vehicle A. This swinging mechanism 6 is driven by an operating hydraulic motor $M_1$ which constitutes, together with the hydraulic motors $M_1$ the above-mentioned actuator means. Like the driving hydraulic motors $M_1$, the operating hydraulic motor $M_2$ is equipped with pressure withstanding and waterproof properties, and is operated typically by means of hydraulic pressure or water glycol. The driving hydraulic motors $M_1$ and the operating hydraulic motor $M_2$ consist of hydraulic motors, plunger motors or the like. They will be generally referred to as hydraulic motors constituting the actuator means.

A first, a second and a third hydraulic cylinder 7, 8 and 9 for swinging the first, second and third arms 3, 4 and 5 are provided between the vehicle body 1 and the first arm 3, between the first and second arms 3 and 4, and between the second and third arms 4 and 5, respectively.

The reference numeral 10 indicates an operation attachment which, as shown in FIG. 1, is mounted on the front-end section of the third arm 5 and which includes scissor-like jaws 10a, 10a to be opened and closed by means of a hydraulic cylinder 10b.

This operation attachment 10 is swung by means of a fourth hydraulic cylinder 11 which is attached thereto through links 12a, 12b provided between the third arm 3 and the bracket of the operation attachment 10.

The first hydraulic cylinder 7, the second hydraulic cylinder 8, the third hydraulic cylinder 9, the opening/closing hydraulic cylinder 10b and the fourth hydraulic cylinder 11 will be collectively referred to as the hydraulic cylinders constituting the actuator means. These hydraulic cylinders are also equipped with pressure withstanding and waterproof properties.

Figure 5:
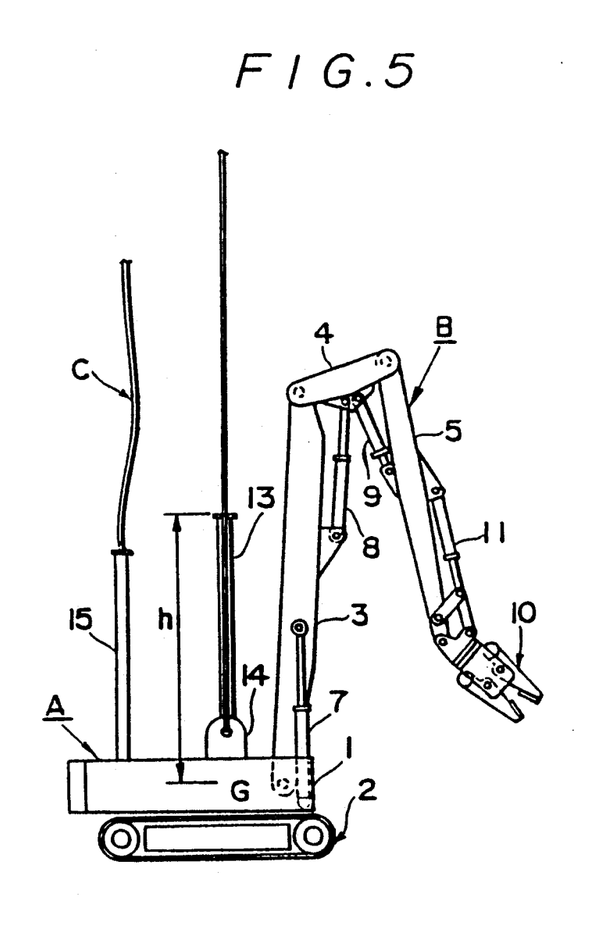
FIG. 5 shows the undersea vehicle as it is lowered to the sea bottom.
Figure 6:
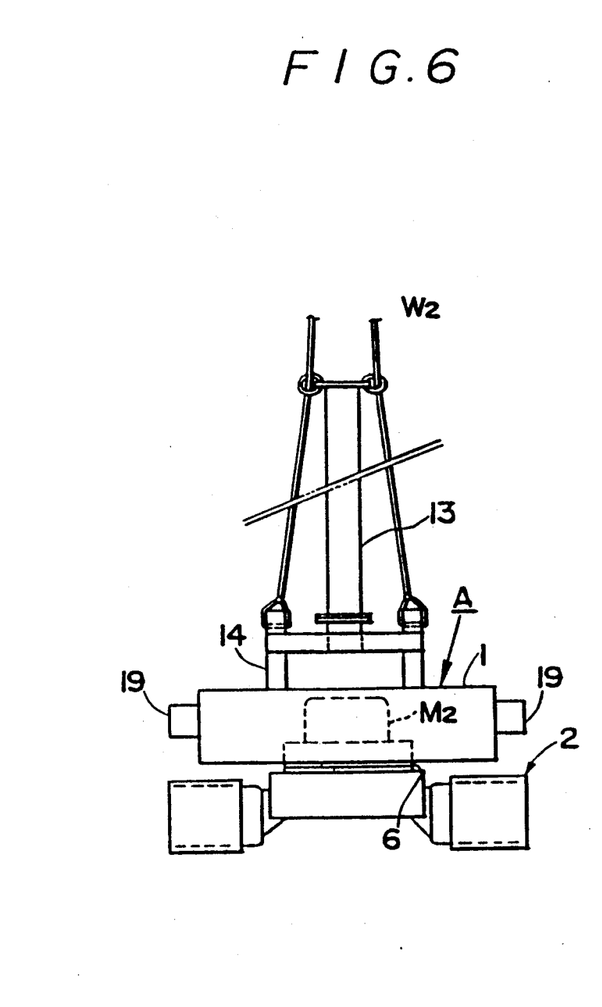
FIG. 6 is a rear view showing the undersea vehicle as suspended by a crane.

The reference character 13 indicates a suspending pole which is arranged upright, through a flange or the like, on the pedestal of a suspending reinforcement section 14 provided on the vehicle body 1 at a position G that corresponds to the center of gravity when the arms 3 to 5 of the boom B are folded up as shown in FIG. 5 (see FIGS. 1, 4, etc.).

The reference numeral 15 indicates a tubular cable pole for preventing the cable from getting entangled. This tubular cable pole 15 is arranged upright at a position in the rear section of the vehicle body 1 and has approximately the same height as the suspending pole 13 (see FIGS. 1, 5, etc.).

Boom searchlights 16 are provided at appropriate positions on the boom B, serving to illuminate the operation attachment 10 which is at the front end of the boom as well as the area around it. A plurality of boom video cameras 17 for photographing the areas around the boom searchlights 16 are also provided on the boom B.

Figure 7:
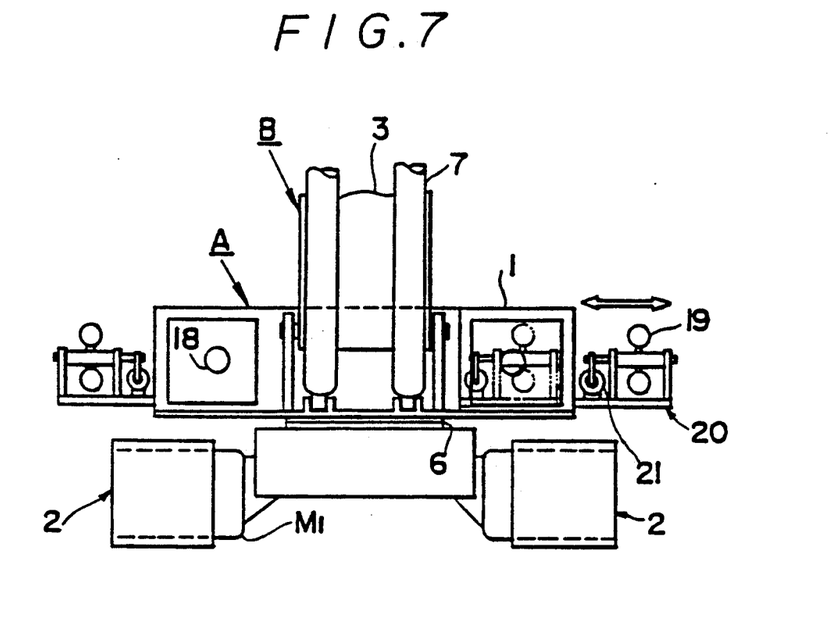
FIG. 7 is a front view of the undersea vehicle.
Figure 8:
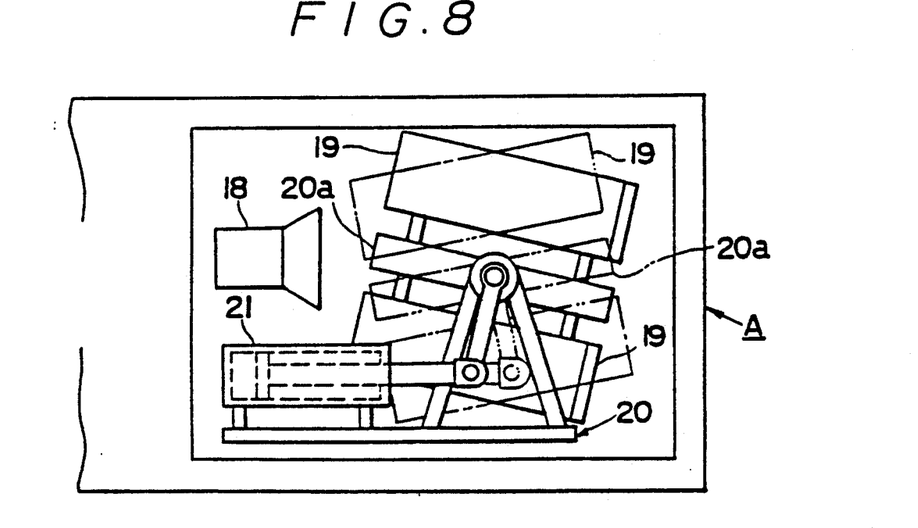
FIG. 8 is a side view showing the mounting structure of undersea video cameras on the undersea vehicle.
Figures 9, 10:
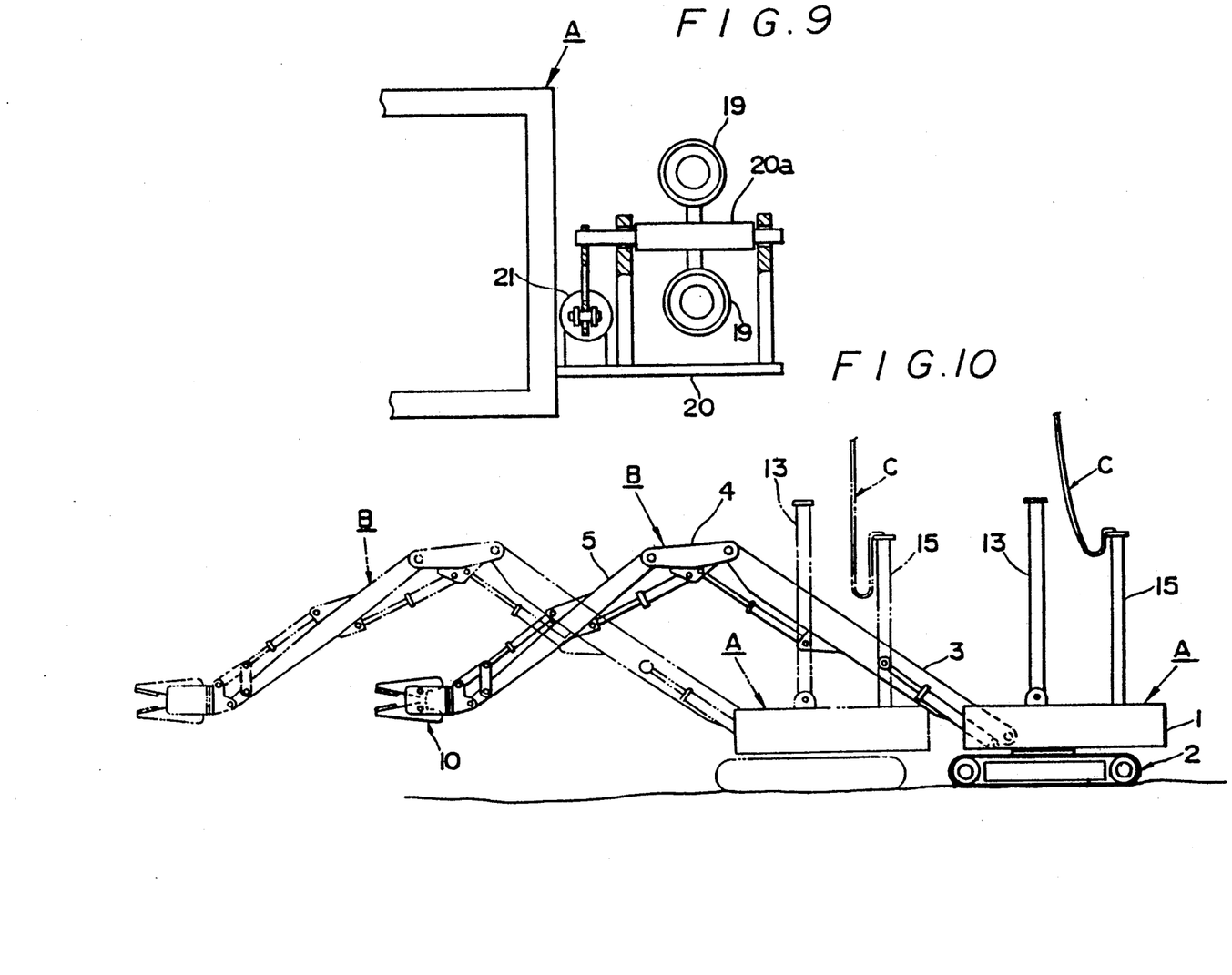
FIG. 9 is a front view of a section where undersea video cameras are provided.
FIG. 10 is a side view showing how the undersea vehicle travels.
Figure 11:
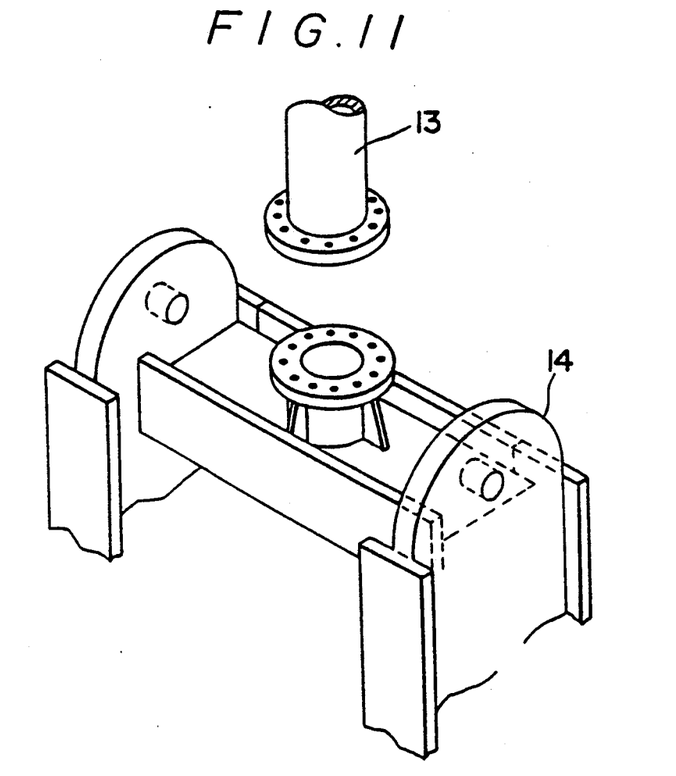
FIG. 11 is an exploded perspective view of the base section of a suspending pole.

Provided at the four corners of the vehicle body 1 are vehicle searchlights 18 and vehicle video cameras 19 (see FIG. 3). As shown in FIGS. 3, 7 and 9, those video cameras 19, 19 which are arranged in the front section of the vehicle body are fixed to support members 20a, 20a which are pivoted to mounting frames 20, 20 protruding from the sides of the vehicle body 1. The support members 20a, 20a are respectively moved by camera hydraulic cylinders 21 so as to swing the vehicle video cameras 19 in the vertical direction.

Both the boom video cameras 17 and the vehicle video cameras 19 are equipped with waterproof and pressure withstanding properties.

The reference character P indicates a hydraulic pump provided on a floating base on the sea. This hydraulic pump P consists of a gear pump or the like and can provide a high discharge pressure (e.g., about 200 kg/cm$^2$ to 300 kg/cm$^2$).

The reference character D indicates a prime mover which may consist of an internal combustion engine such as a diesel engine, a steam turbine, an electric motor, etc. The efficiency of this prime mover D is such that the hydraulic pump P yields a high discharge pressure.

The hydraulic pump P and the prime mover D constitute, together with a control valve V, a unit which will be referred to as a driving power source.

The reference character R indicates a control cabin which includes an operator's seat 23 and a lever 22 for controlling the hydraulic cylinders and the hydraulic motors. Provided in front of the seat 23 are supervising television sets 24, 24, ... for displaying images photographed by means of the boom video cameras 17, 17, . . . and the vehicle video cameras 19, 19, ... The lever 22 allows the operator to control the control valve V connected to the hydraulic pump P. The lever 22 is connected to the control valve V through piping T.

A high-pressure hydraulic hose $C_1$ is provided between the hydraulic pump P and the respective hydraulic motors as well as between the hydraulic pump P and the respective hydraulic cylinders. Apart from this, a power source cable $C_2$ for the boom searchlights 16 and the vehicle searchlights 18 is provided, thereby allowing the operator to operate the hydraulic motors and the hydraulic cylinders in the control cabin R. Further, another power source cable $C_2$ is provided between the television sets 24 and the boom video cameras 17 as well as between the television sets 24 and the vehicle video cameras 19. The high-pressure hose $C_1$ and the power source cables $C_2$ will be collectively referred to as a cable C.

The reference character S indicates a backup ship on which the control cabin R, the prime mover D and the hydraulic pump P are provided. Accordingly, the cable C connecting the undersea vehicle A and the backup ship S to each other has a length corresponding to the depth of the sea region concerned (see FIG. 1).

As shown in FIG. 1, the backup ship S has a crane K which is connected to the upper end of the suspending pole 13 through a wire $W_1$, a hook H at the lower end of the wire $W_1$, and a wire $W_2$. The wires $W_1$ and $W_2$ will be collectively referred to as a wire W.

The lower end of the cable C enters the above-mentioned tubular cable pole 15, branching off to the different vehicle parts from the rear section thereof. By virtue of this arrangement, that portion of the cable C which is around the undersea vehicle A is prevented from becoming entangled with the boom B, etc., when the vehicle A travels or turns during undersea operation.

As shown in FIG. 4, the undersea vehicle A is further equipped with a horizontal-position level sensor 25 and a highly directional microphone 26, which are arranged in the interior of the vehicle. The reference numeral 27 indicates a weight provided at the rear end of the undersea vehicle A. Another weight (not shown) is provided at the lower end of the tubular cable pole 15.

With this embodiment having the above-described construction, the operator in the control cabin R maneuvers the undersea vehicle A on the sea bottom, while watching the television sets 24. First, the driving power source is operated so as to actuate the hydraulic motors and the hydraulic cylinders, thus causing the undersea vehicle A to travel, the boom B to be swung, and the operation attachment 10 to be operated.

When the undersea operation is over, the undersea vehicle A, etc. are lifted by the crane and restored to the ground, or transferred to another operation site, where the requisite operation is performed in a similar manner.

Thus, the undersea operation system in accordance with this embodiment comprises: an undersea vehicle A having a traveling unit 2, a boom B, and an actuator means for driving the traveling unit 2 and the boom B, the actuator means consisting of hydraulic motors and hydraulic cylinders; and a floating base having a control cabin and a driving power source adapted to drive the actuator means and including a hydraulic pump P and a prime mover D; the actuator means and the driving power source being connected to each other through a cable C. This arrangement is advantageous in that it allows the undersea vehicle to be driven very efficiently, and that it allows an undersea operation in a deep sea region to be conducted for a long time.

These advantages will be further discussed in detail. First, the undersea vehicle A includes no diesel engine or the like, but is equipped only with hydraulic motors and hydraulic cylinders which serve as the actuator means for the, travel unit 2 and the boom B. The very fact that they are operated by hydraulic pressure assures that the hydraulic motors and hydraulic cylinders can exhibit excellent pressure withstanding and waterproof properties without undergoing special modifications. Specifically speaking, their discharge pressure is about 200 kg/cm$^2$. Thus, if the operation is to be conducted at a depth of, for example, 200 m, the pressure on the vehicle will be about 20 atm., a value which is far smaller than the upper limit they can withstand. From another viewpoint, they are strong enough to receive liquid at a considerably high pressure, so that a sufficient actuating pressure can be obtained even taking into account the pressure loss due to the resistance resulting from the great length of the cable C.

Furthermore, since the vehicle uses no diesel engine or the like as the prime mover D but hydraulic cylinders and hydraulic motors having pressure withstanding and waterproof properties, practically no trouble will be involved during undersea operation. Moreover, since the hydraulic pump P and the prime mover D for driving these hydraulic cylinders and hydraulic motors are provided on a floating base on the sea, they can be operated under substantially the same condition as on the ground, the hydraulic pump P and the prime mover D being operated with a satisfactory mechanical efficiency. In addition, even when the cable C connecting the hydraulic pump P to the hydraulic motors and the hydraulic cylinders is considerably long, and consequently involves a pressure loss due to the resistance resulting from its length, such a pressure loss is of no great account since the system can be operated at a very high hydraulic pressure. Thus, undersea operations can be conducted under practically the same conditions as on the ground, using a very powerful undersea vehicle A.

Moreover, since it is maneuvered on the backup ship S, the system involves none of those inconveniences experienced with undersea operations conducted by divers. Divers can operate at depths of no more than 50 m or so, and that for a very short time. In contrast, the system of this invention allows undersea operations to be conducted with an operational efficiency equal to or higher than that of a power shovel.

As described above, the construction of the system of this invention is such that the undersea actuator section is separated from the prime mover section on the sea, which makes it possible to perform undersea operations exclusively with those components which have satisfactory pressure withstanding and waterproof properties. The prime mover D which may consist of a diesel engine or the like can be operated on the sea under practically the same conditions as on the ground. Even when an increase in resistance takes place in the cable C due to a marine current or the like and the region concerned is so deep as to involve a considerable pressure loss in the high-pressure hose $C_1$ of the cable C due to the resistance resulting from the length of the cable, such a pressure loss due to the above-mentioned factors can be well overcome by virtue of the durability of the cable C itself, the stability due to the weight of the undersea vehicle A, and the manner in which the vehicle is suspended from the backup ship.

Though simple in construction as industrial machinery, the above-described embodiment has proved capable of operating at a depth of about 200 m with the same efficiency as on the ground. Apart from this, the system is advantageous in that it can operate as long as its mechanical durability allows, a feature which cannot possibly be realized by conventional systems depending on divers.

Another advantage of the system of this invention is that the upper end of the suspending pole 13, arranged upright at a position approximately corresponding to the center of gravity G of the undersea vehicle A, is connected to the crane K, even during undersea operation, through the wire, so that the undersea vehicle A can travel on the sea bottom in a stable manner. That is, the undersea vehicle A is suspended from the backup ship S at a position over the position G corresponding to its center of gravity, so that if the vehicle threatens to tumble down due to unexpected geographical irregularities of the sea bottom, it can be restored to its upright attitude by lifting it by means of the crane K as soon as such a situation is detected. As stated above, the suspending pole 13 is situated at a position approximately corresponding to the center of gravity G of the undersea vehicle A. Further, as shown in FIG. 5, the vehicle is suspended at a position higher than itself by the length h of the pole 13. By virtue of this arrangement, the undersea vehicle can be maintained in a very stable condition, subject to no unexpected rolling or tipping. The undersea vehicle A can be kept in a substantially horizontal position while it is being lifted. Thus, the undersea vehicle A allows itself to be smoothly restored to its upright attitude, whereby the stability in undersea operations can be ensured. The undersea vehicle A can also be kept in a stable condition when it is being lowered to the sea bottom by the crane K.

Figure 14:
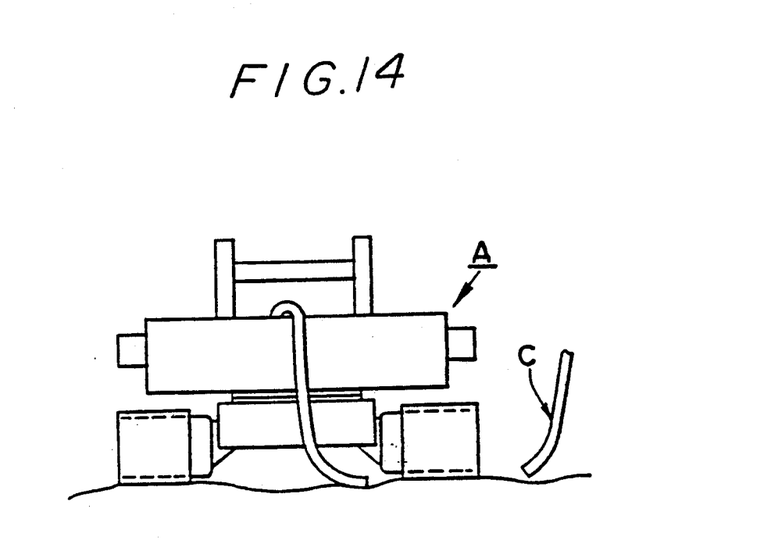
FIG. 14 shows the condition where no tubular cable pole is provided on the undersea vehicle.

Further, as described above, a tubular cable pole 15 for preventing the cable from getting entangled is provided on the undersea vehicle A, and that portion of the cable C which is around the undersea vehicle A is lodged in this tubular cable pole 15. Thanks to this arrangement, the cable C is prevented from being broken in an unexpected accident. That is, the tubular cable pole 15 reliably helps to avoid the danger of the undersea vehicle A running over the cable C and breaking it as shown in FIG. 14, a feature which is particularly advantageous for undersea operations in a deep sea region where the system is rather difficult to control.

Further, if the undersea vehicle travels, as shown in FIG. 10, to the left (as viewed in the drawing), the cable C does not get entangled thanks to the presence of the tubular cable pole 15. That is, such a movement of the vehicle only results in that portion of the cable C over the pole 15 becoming loose.

In addition, the system is designed such that the boom B is equipped with boom searchlights 16 and boom video cameras 17, and that the undersea vehicle A is equipped with vehicle searchlights 18 and vehicle video cameras 19, images photographed by these video cameras being displayed on television sets 24. By virtue of this arrangement, undersea operations can be supervised on the sea practically as with the naked eye, thereby ensuring the work safety and reliability.

Figure 12:
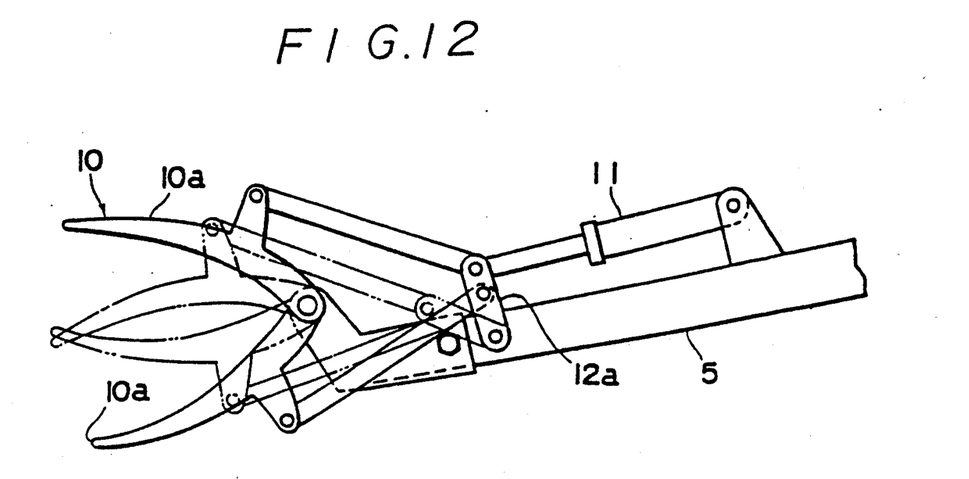
FIGS. 12 and 13 are side views of the attachment sections in other embodiments.
Figure 13:
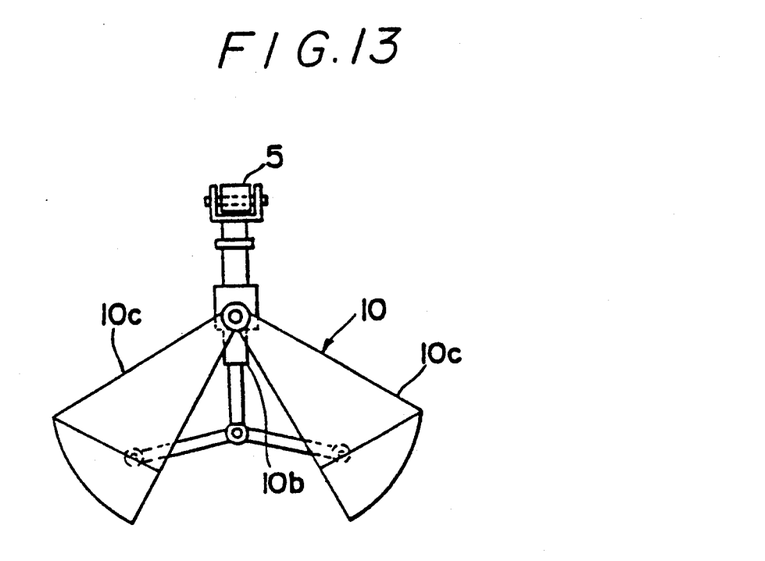

As shown in FIG. 12, the operation attachment 10 may be opened and closed by the fourth hydraulic cylinder 11, instead of providing the opening/closing cylinder 10b. The example shown is intended for a gripping motion. The opening/closing movement is effected by means of the link 12a which is driven by the fourth hydraulic cylinder 11. In this example, an auxiliary piece is arranged between the front end of the third arm 5 and the operation attachment 10. The operation attachment 10 may be one of a bucket type as shown in FIG. 13. With this bucket type attachment, a bucket unit consisting of separate buckets 10c, 10c is opened and closed by means of the opening/closing hydraulic cylinder 10b.

It is also possible to provide around the tubular cable pole 15 a cable receiving section for coiling up the cable C and receiving it when it becomes loose, which allows the cable C to be prevented more effectively from getting entangled around the undersea vehicle A.

While in the above description the present invention has been shown as applied to an undersea operation machine which consists of a vehicle A and a boom B, it is understood that this invention is not limited to this specific embodiment, but it can be applied to other types of operation machines having different constructions.

What is claimed is:

1. An undersea operation system comprising, in combination: an undersea vehicle having a traveling unit, a boom, and an actuator means for driving said traveling unit and said boom, said actuator means including hydraulic motors and hydraulic cylinders; and a floating base which has a control cabin and a driving power source adapted to drive said actuator means and including a hydraulic pump and a prime mover; said actuator means and said driving power source being connected to each other through a first cable, wherein said vehicle has a suspension pole extending upwardly therefrom to a predetermined height and further including a second cable having an upper end adapted to be connected to said floating base and a lower end connected to the suspension pole during undersea operation of said undersea operation machine, said suspension pole being arranged at a position on the vehicle corresponding to the center of gravity of said vehicle when said boom is in a predetermined operation, the undersea vehicle can travel on the sea bottom in a stable manner with the second cable operable to restore the vehicle to an upright attitude if the vehicle tumbles due to geographical irregularities in the sea bottom; and entanglement prevention means for preventing said first cable from becoming entangled with said second cable, wherein said entanglement prevention means includes a tubular cable pole provided on said vehicle, said tubular cable pole lodging said second cable, said tubular cable pole being spaced from a point of suspension extending between the vehicle and the suspension pole.

2. An undersea operation system comprising, in combination:

(a) an undersea operation machine having a vehicle; a boom comprising a plurality of arms and including a root section supported on said vehicle so as to be able to swing and a front-end section to which an interchangeable operation attachment is attached; and an actuator means for actuating said vehicle, said boom and said operation attachment and said actuator means being operated by hydraulic pressure;

(b) a backup ship having a driving power source for supplying hydraulic pressure to said actuator means, and a crane for suspending said undersea operation machine; and (c) a first cable for connecting said driving power source to said actuator means, wherein said vehicle has a suspension pole extending upwardly therefrom to a predetermined height and further including a second cable having an upper end connected to said crane and a lower end connected to the suspension pole during undersea operation of said undersea operation machine, said suspension pole being arranged at a position on the vehicle corresponding to the center of gravity of said vehicle when said boom is in a predetermined position with respect to said vehicle such that during undersea operation, the undersea vehicle can travel on the sea bottom in a stable manner with the second cable operable to restore the vehicle to an upright attitude if the vehicle tumbles due to geographical irregularities in the sea bottom; and (d) entanglement prevention means for preventing said first cable from becoming entangled with said second cable, wherein said entanglement prevention means includes a tubular cable pole provided on said vehicle, said tubular cable pole lodging said second cable, said tubular cable pole being spaced from a point of suspension extending between the vehicle and the suspension pole.

3. An undersea operation system as claimed in claim 2, wherein said actuator means comprises hydraulic motors and hydraulic cylinders, and wherein said driving power source comprises a hydraulic pump and a prime mover.

4. An undersea operation system as claimed in claim 2, wherein searchlights and cameras are provided at different positions on said vehicle and said boom, images photographed by means of said cameras being monitored on said backup slip.

5. The undersea operation system of claim 1, wherein an upper end of said tubular cable pole terminates at an elevational position below the upper end of the suspension pole.

6. The undersea operation system of claim 2, wherein an upper end of said tubular cable pole terminates at an elevational position below the suspension pole.

* * * * *